Aug. 1, 1967  D. J. REISINGER ET AL  3,333,394
PRESS AND HEAT SEALING DEVICE

Filed Feb. 4, 1965  2 Sheets-Sheet 1

United States Patent Office 3,333,394
Patented Aug. 1, 1967

3,333,394
PRESS AND HEAT SEALING DEVICE
Delwin J. Reisinger and John M. Cook, Greenville, S.C., assignors to W. R. Grace & Co., Duncan, S.C., a corporation of Connecticut
Filed Feb. 4, 1965, Ser. No. 430,355
3 Claims. (Cl. 53—124)

This invention relates to a device for compacting and heat sealing a product wrapped in a heat sealable film.

It is now a well-accepted practice to enclose consumer products in a thermoplastic film and then heat seal the overlapped areas. The product is further enhanced in appearance and preservative characteristics if the employed film is also heat shrinkable. Thus, when the wrapped product is subjected to heat shrinking temperatures the film shrinks tightly about the product forming a "skin-tight" package. In many cases, it is possible to do the heat sealing and heat shrinking in one step. This practice is widely employed for a multitude of food and non-food products.

In many instances the product, especially food, needs to be compacted prior to the heat sealing and heat shrinking operation. One especially noteworthy example that is commercially important is the packaging of large blocks of cheese. Although not to be limited in any way to any particular product or film, the invention is particularly useful for compacting and heat sealing these large 20 to 60 pound blocks of cheese. The invention will be thus described with reference to this particular product.

In general, the preparation of the cheese block may be described as follows. After the curd has been drained and the cheese preliminarily pressed in cloth in rectangular hoops into rectangular blocks, the cloth is stripped and wrapped in a heat sealable wrapper. A particularly suitable film for wrapping cheese is a Saran film, i.e. a thin transparent, biaxially oriented film prepared from a copolymer of vinylidene chloride with vinyl chloride, etc The use of a heat sealable and heat shrinkable film eliminates the steps of dressing, overnight pressing, drying and paraffining, and the formation of rind.

The wrapped cheese block is then placed in a cheese press which applies pressure to compact the cheese while simultaneously applying a heat sealing temperature to heat seal the overlapping film edges. The heat also heat shrinks the film and causes "oiling off," i.e. melting the oily fats on the surface of the cheese to present a smooth appearance and to cause the film to stick to the cheese thereby reducing mold growth.

One of the difficulties with the cheese presses heretofore available is in the handling of these large blocks of hot cheese and in the removal of the hot cheese block from the press so as to prevent burn-through and without tearing of the film.

It is an object of the invention to provide a device for heat sealing film overwrapped about a product.

Yet another object is to provide a device for compacting a product.

Still another object is to provide a device for simultaneously compacting and heat sealing a product wrapped in a heat sealable film.

These and other objects will be readily apparent to those skilled in the art from the following disclosure, appended claims and drawing.

These objects are broadly accomplished by a device providing means for immediately and completely ejecting the compressed and heat sealed product from the press at the end of a predetermined period of time.

In one embodiment the door to the press activates means for compacting the product and for ejecting the product from the press.

Figure 1:
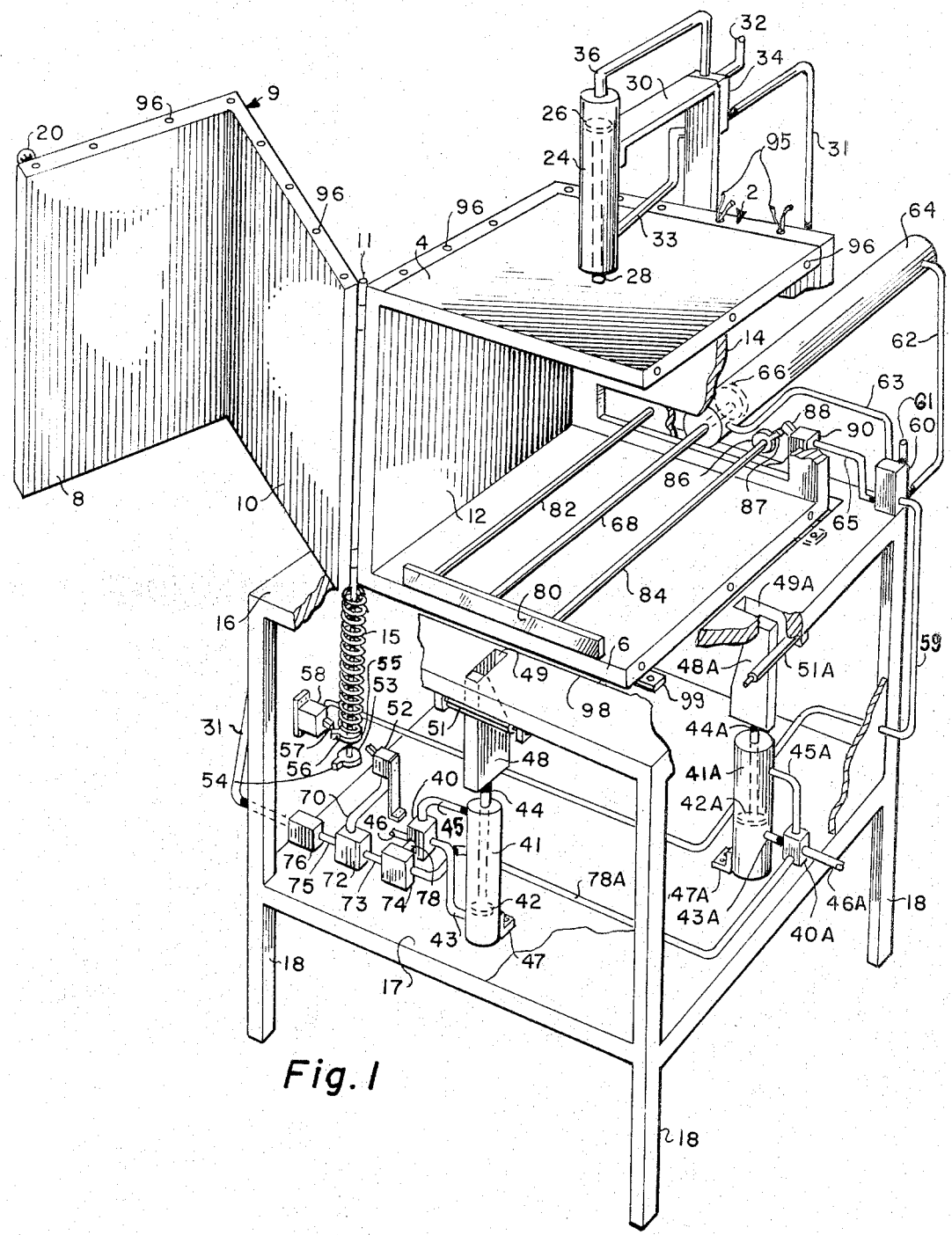
FIGURE 1 is a perspective view of the entire press assembly with the door open and the product already ejected.
Figure 2:
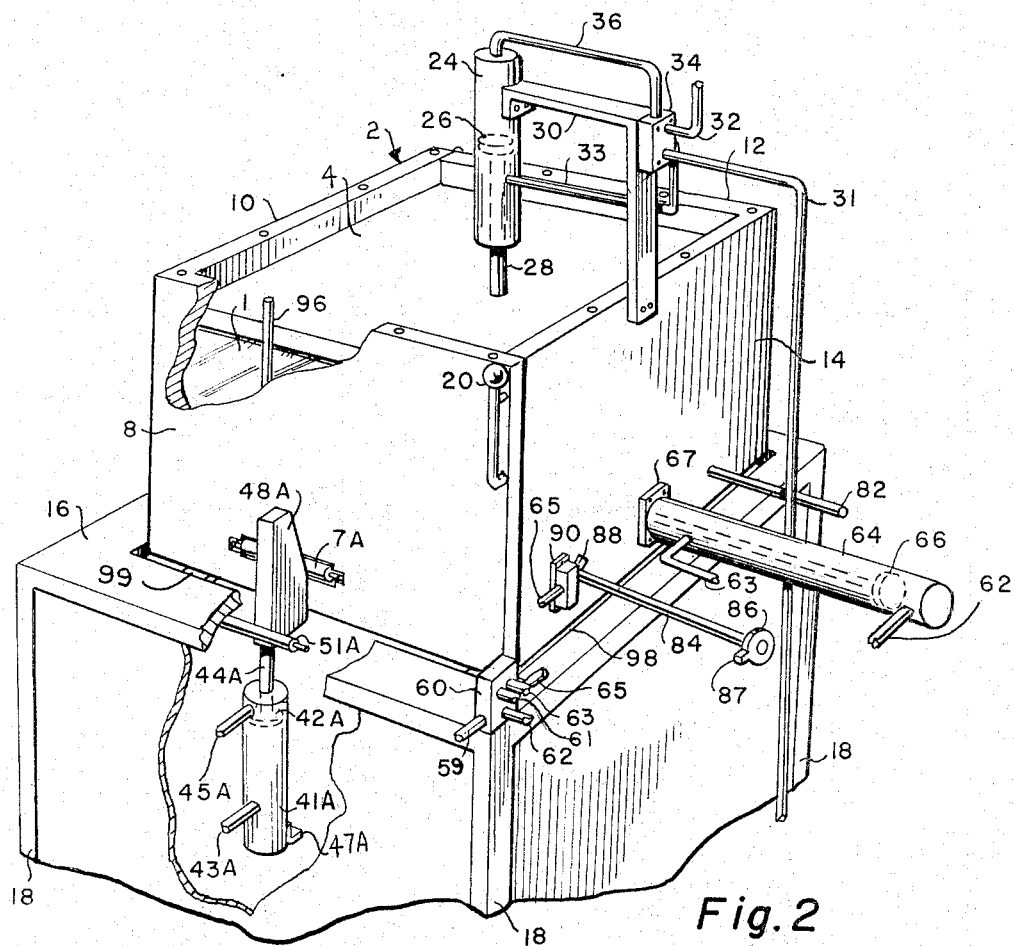
FIGURE 2 is a perspective view of the entire press assembly with the door closed and the product being compacted and heat sealed.

In FIGURE 1 the cheese press is shown immediately after the block of cheese has been ejected from the chamber but prior to retraction of the ejection member 80. The press 2 can be any shape or size but for 20–60 pound blocks and the like is about 11x14 inches, internal dimensions, with variable heights depending on the size of the block. The press comprises a vertically reciprocal top wall 4, a bottom wall or surface 6 which may conveniently be part of the table surface, and a plurality of upright side walls 8, 10, 12, and 14. The walls are joined together in any suitable manner to enclose a chamber or cavity having substantially the configuration of the product being compressed. The entire press assembly is conveniently supported on a table 16 having legs 18 and shelf 17. At least one of the walls must be movable inwardly so as to compress the product. In the press shown, the top wall 4 is vertically reciprocal by being attached to a suitable reciprocating means, such as air cylinder 24 (attached to a suitable supporting means such as bracket 30) having a piston 26 attached by piston rod 28 to the wall 4. By introducing air through conduit 32, 3-way valve 34, and conduit 36, pressure is exerted on the top of piston 26 driving the top wall 4 downwardly thus compressing the block 1. Conversely, by introducing air through conduit 32, 3-way valve 34 and conduit 33, pressure is exerted on the bottom of the piston 26 driving the top wall upwardly when the heat sealing cycle is over.

Since the block of cheese is to be rectangular, in this example, the walls form right angles with each other. At least one of the walls must be removable or hinged in such a manner as to provide access to the interior of the press. In one suitable press two of the walls, 8, 10 are joined together to form a 90° door 9 thus permitting the block to be introduced through one side of the chamber and removed from another side when the door is open. Accessory equipment for transporting the block to and from the press is not shown and is within the skill of the art. The door 9 may be hinged in any suitable manner such as hingedly connecting movable side wall 10 to an edge of fixed wall 12 by a hinge 11. It is preferred, though not essential, to provide some means for urging the door open in the absence of restraining means. Thus, a helical spring 15 may be attached to a downward extension of the shaft of hinge 11. A handle 20 may be attached to the door to facilitate opening. The door and hinges should be of such construction that they do not impede the entry or removal of the product from the press.

The source of fluid or air to the various inlet conduits for the valves has not been shown to simplify the drawing and it is well within the skill of the art to provide this and other plumbing, electrical and mechanical connections.

The interior wall surfaces of the press must be heated to heat sealing temperatures, e.g. 255–265° F. for saran film about 0.5–2.0 mils thick on blocks of cheese at about room temperature. This is conveniently done by the use of electrical resistance rods 96 (suitably connected to a power source (not shown) by connections exemplified by electrical connections 95) disposed in the walls. Preferably the rods are positioned so as to provide maximum heat in the area adjacent the overwrapped areas to be heat sealed and to provide minimum heat at the edges of the block to prevent rounding off, thus minimizing waste in subsequent cutting operations.

Figure 3:
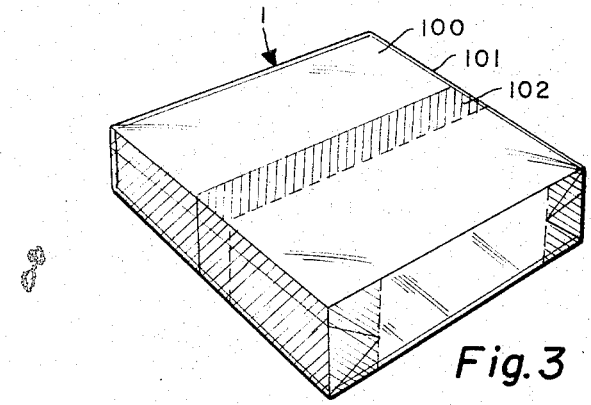
FIGURE 3 is a perspective view of the compacted, wrapped cheese block.

The block-shaped mass of cheese 100 is wrapped in a heat-sealable wrapper 101. Any suitable manner of wrapping can be employed, such as shown in FIGURE 3 where the wrapper 101 is brought up along the sides, front, and rear of cheese 100 and the wrapper sides are overlapped across the top 102 of the mass and then folded over the ends.

Since the bottom surface 6 of the pres is hot, the surface of the table 16 also tends to be very hot providing considerable discomfort to the operator when inserting the block into the press. A convenient method of reducing this heat transfer is to provide an air gap 98 in the table surface 16 around the outside of the side walls thus providing an air gap having low thermal conductivity. The press and table surface are supported by any suitable means such as brackets 99 attached to the underside of the table surface and to the press.

When the block of cheese has been placed in the press, either manually or automatically through the opening left by wall 8, the door 9 is at least partially closed by the operator. Means are provided for fixedly securing the door in a closed position. Any suitable locking mechanism is employable such as latching members 48, 48A, which operate simultaneously in the same manner, therefore, for the purpose of illustration only latching member 48A is described herein. Latching member 48A is vertically reciprocal by being operably connected to an air cylinder 41A supported by mount 47A on shelf 17, having a piston 42A attached by piston rod 44A to latching member 48A. By introducing air through conduit 46A, 3-way valve 40A and conduit 43A, pressure is exerted upward on the bottom of the piston 42A forcing latching member 48A over roller 51A upward through opening 49A to a securely fixed position on roller 7A mounted in a recessed area on wall 8. The pressure of the latching member thus locks the door in a closed position and provided an inward thrust on wall 8 thus assisting in compressing the sides of the block 1. Thus, it is unnecessary for the operator to completely close the door. Instead the door is closed past the recessed door latch, at which point the latch is automatically raised to completely close the door. A safety switch may also be provided to prevent actuation until the door is closed so as to prevent injury to the operator. The length of the rollers (bearing) 7A mounted on the door should be of sufficient length to contact the latching members 48, 48A when the door is placed into position for further closing.

Latching member 48A is released from the closed position by introducing air through conduit 46A, 3-way valve 40A and conduit 45A, thus exerting pressure on the top of the piston 42A releasing latching member 48A downward through the opening.

When the cheese block has been compressed and heat sealed, means are provided for ejecting it immediately and completely from the device, and any danger of burning either the film or the operator is thus eliminated. An ejection member 80 is positioned in wall 14 opposite wall 10 in door 9 and is adapted to automatically and completely eject the block from the press at the end of a predetermined dwell time. Ejection member 80 is horizontally reciprocal by being operably connected to a suitable reciprocating means such as air cylinder 64 supported by flange mount 67 on wall 14. The air cylinder has a piston 66 attached by piston rod 68 to ejection member 80 which is guided by any suitable means such as guide rods 82 and 84. By introducing air through conduit 61, 3-way valve 60 and conduit 62, pressure is exerted on the back of the piston 66 thus forcing ejection member 80 horizontally outward from wall 14 for a distance substantially equal to the width of wall 12 as shown in FIGURE 1. The ejection member 80 is preferably a flat elongated member, as shown, but may be any width or shape sufficient to cause ejection of the product.

By introducing air through conduit 61, 3-way valve 60 and conduit 63, pressure is exerted on the front of the piston 66 retracting ejection member 80 into a recessed area on wall 14 in preparation to begin a new cycle. The ejection member must be flush with the wall to prevent an imprint on the hot compressed cheese.

It is most important that the product can be completely ejected from the press chamber before any burn-through of the film can develop. This is conveniently accomplished by the use of a timing means 72 operably connected to the door so that when the door is closed, the timer is initiated by a suitable switch mechanism connected to the door. For example, the door hinge 11 is extended downwardly below the table surface and provided with a collar 53 having a projection 54 which trips an activating means, e.g. microswitch 52. The switch transmits a signal (electrical or pneumatic) through conduit 70 to timer 72, thereby activating the timer. Simultaneously, the closing of the door also results in a signal being transmitted by or through timer 72 and then through conduit 75, transducer 76, and conduit 31 to actuate 3-way valve 34 thus forcing air through conduit 36 and driving top wall 4 downward to compress the cheese block 1 as hereinbefore described. At the same time, the closing of the door causes a signal to be transmitted through timer 72, conduit 73, and transducer 74 and conduits 78, 78A to actuate valves 40, 40A thus forcing air through conduits 43, 43A to drive the latching members 48, 48A upwardly to latch the door. Thus, simply closing the door initiates the timer, latches the door and moves the top wall downward.

The door 9 is preferably spring loaded so that when the hot door is unlatched it is automatically urged to a completely open position to permit removal of the hot product. This is accomplished by any suitable means such as a helical spring 15 attached to hinge 11.

With the block of cheese in the press, the heaters on, and the top wall in a down position, the cheese is subjected to compressive forces to cause compaction of the product while at the same time the hot walls cause the overlapped area to be sealed to each other, the film to shrink tightly about the cheese and the cheese surface to be "oiled-off." The period of time necessary to accomplish these objectives varies with a number of factors such as film, film thickness, type of overlap, size of product, thermal conductivity, heat input, heat loss, temperature of block and the like. For example, a 40 pound block of cheese about 7 x 11 x 14 inches and wrapped in 0.75 mil. saran takes about 9 seconds at 252–265° F. Temperature control and dwell times are important.

By the device of this invention an over-extended dwell time is eliminated. At the end of the predetermined dwell time as pre-set on the timer 72, the timer transmits signals as hereinbefore described to lower the latching means and raise the top wall 4, and a projection 56 on collar 55 strips stud 57 on microswitch 58 which transmits a signal (electrical, pneumatic or mechanical) through conduit 59 to actuate valve 60. This forces air through conduit 62 to drive ejection member 80 outwardly from the wall 14 thus ejecting the cheese block (not shown) completely from the device. Suitable transfer means such as roller, etc. (not shown) may be provided for removal of the product from the area of the press.

When the cheese has been completely ejected, the ejection member 80 is fully extended as are the guide rods 82 and 84. Suitable means are then provided for retracting the ejection member. For example, a projection 88 on microswitch 90 is positioned so as to be activated by a projection 87 on collar 86 on guide rod 84. A signal is then transmitted from microswitch 90 through conduit 65 to valve 60 which is actuated to permit air through conduit 63 thus driving the ejection member 80 backward so as to be flush with wall 14. The device is then ready for the next cycle.

While certain examples, structures, composition and process steps have been described for purposes of illustration, the invention is not limited to these. Variation and modification within the scope of the disclosure and the claims can readily be effected by those skilled in the art.

We claim:

1. A device for compacting and heat sealing a product wrapped in a heat sealable film comprising
   (a) a vertically reciprocal top wall,
   (b) a bottom wall,
   (c) vertical side walls spaced apart and adapted to enclose a cavity having substantially the configuration of the product to be compacted, said walls adapted to receive said top wall,
   (d) at least one of said walls hinged to an adjacent side wall thus forming a door permitting insertion and removal of product,
   (e) means for opening said door,
   (f) means for securing said door in a closed position, and thereafter releasing said door comprising a first roller bearing member positioned on said door, a second roller bearing member positioned below the bottom wall and exterior of the vertical plane of said door, a vertically reciprocal wedge shaped latching member adapted to move upwardly and bearing against said first and second roller bearings to close said door and downwardly to release said door,
   (g) heating means for heating said walls to a heat sealing temperature,
   (h) means for raising and lowering said top wall,
   (i) timing means,
   (j) said door having means cooperating with (f), (i) and (j) to secure said door, lower said top wall and initiate said timing means when said door is in a closed position,
   (k) ejection means positioned in a first side wall opposite said door adapted to move outwardly from said first side wall,
   (l) at the end of a predetermined dwell time said timer cooperating with (f), (h), (e) to release said door, raise said top wall and open said door, and
   (m) said door having means cooperating with said ejection means when said door is opened to move said ejection member outwardly and thus completely and immediately eject the product from the cavity.

2. The device of claim 1 wherein an ejection reversal means cooperates with said ejection means to retract said ejection means when it has attained a predetermined position in its outward travel.

3. A device for compacting and heat sealing a food mass wrapped in a heat sealable film comprising
   (a) a vertically reciprocal horizontal top wall,
   (b) a fixed horizontal bottom wall,
   (c) two movable and two fixed vertical side walls spaced apart and adapted, in conjunction with (a) and (b) to enclose a cavity having a rectangular cross section of substantially the configuration of said food mass, said walls adapted to receive the top wall,
   (d) said two movable walls being adjacent each other and secured to each other at the adjacent edge, a remote edge of one of the movable walls being hinged to an adjacent edge of a fixed wall, said movable walls thus forming a door hinged to a fixed wall,
   (e) heating means disposed in said walls adapted to heat said walls to a temperature sufficient to heat seal the overwrapped film,
   (f) an urging means cooperating with said door to urge said door to an open position,
   (g) removable latching means for securing said door in a closed position and providing an inward thrust to assist in compressing said food mass,
   (h) a first reciprocal means operatively connected to said latching means for alternately securing and releasing said latching means,
   (i) a second reciprocal means operatively connected to said top wall adapted to alternately raise and lower said top wall,
   (j) a first activating means cooperating with said door,
   (k) a timing means responsive to a first signal from said first activating means and initiated when said door is closed,
   (l) a first activating means operatively connected to said timing means and said first reciprocal means,
   (m) a second actuating means operatively connected to said timing means and said second reciprocal means,
   (n) the closing of said door thus activating said first activating means which transmits a first signal to said timing means to start a timed cycle and transmits a second and third signal to said first and second actuating means respectively to secure said latching means and to lower said top wall,
   (o) said timing means transmitting a fourth and fifth signal at the termination of a predetermined dwell time to said first and second actuating means respectively to release said latching means, thus opening said door, and to raise said top wall,
   (p) an ejection member positioned in a first fixed side wall adjacent the opening through which said food mass is inserted into the cavity when said door is open, said ejection member being flush with said first wall when said door is closed but adapted to move horizontally outwardly from said first wall for a distance at least equal to the width of the adjacent fixed side wall,
   (q) a third reciprocal means operatively connected to said ejection member,
   (r) a second activating means cooperating with said door adapted to transmit a sixth signal when said door is in an open position,
   (s) a third actuating means operatively connected to said third reciprocal means and said second activating means and responsive to said sixth signal to move said ejection member outwardly to immediately and completely eject the said food mass from said cavity,
   (t) a third activating means cooperating with said ejection member adapted to transmit a seventh signal when said ejection member has attained a predetermined position in its outward travel, and
   (u) said seventh signal actuating said third actuating means to retract said ejection member flush with said first fixed wall thus preparing said device for a new cycle.

References Cited

UNITED STATES PATENTS

| 1,596,117 | 8/1926 | Pickett | 53—124 |
| 1,716,488 | 6/1929 | Doering et al. | 53—124 |
| 2,682,139 | 6/1954 | Cox | 53—124 |
| 2,995,879 | 8/1961 | Laabs | 53—124 |

GRANVILLE Y. CUSTER, JR., *Primary Examiner.*